United States Patent
Miyokawa

(10) Patent No.: US 8,213,481 B2
(45) Date of Patent: Jul. 3, 2012

(54) SEMICONDUCTOR LASER MODULE AND MANUFACTURING METHOD THEREFOR

(75) Inventor: Jun Miyokawa, Ichikawa (JP)

(73) Assignee: Furukawa Electric Co., Ltd., Chiyoda-Ku Tokyo (JP)

( * ) Notice: Subject to any disclaimer, the term of this patent is extended or adjusted under 35 U.S.C. 154(b) by 0 days.

(21) Appl. No.: 13/254,456

(22) PCT Filed: Mar. 10, 2010

(86) PCT No.: PCT/JP2010/054011
§ 371 (c)(1),
(2), (4) Date: Sep. 1, 2011

(87) PCT Pub. No.: WO2010/110068
PCT Pub. Date: Sep. 30, 2010

(65) Prior Publication Data
US 2011/0317735 A1 Dec. 29, 2011

(30) Foreign Application Priority Data
Mar. 25, 2009 (JP) ................... 2009-075229

(51) Int. Cl.
*H01S 5/00* (2006.01)
*H01S 3/08* (2006.01)
*H01L 21/00* (2006.01)

(52) U.S. Cl. .......... 372/107; 372/50.1; 372/108; 438/31

(58) Field of Classification Search ............. 372/50.1, 372/107, 108
See application file for complete search history.

(56) References Cited

U.S. PATENT DOCUMENTS
6,164,837 A 12/2000 Haake et al. ............ 385/90
7,263,266 B2 8/2007 Williamson ............ 385/137

FOREIGN PATENT DOCUMENTS
| JP | 6-222249 | 8/1994 |
| JP | 2000-183445 | 6/2000 |
| JP | 2006-509254 | 3/2006 |

*Primary Examiner* — Armando Rodriguez
(74) *Attorney, Agent, or Firm* — Bui Garcia-Zamor; Hung H. Bui, Esq.

(57) ABSTRACT

A light-emitting element mount (4) is fixed onto a base (8), and a semiconductor laser element (1) is fixed onto the light-emitting element mount (4). An anchor member (5), which is in the shape of a roughly rectangular plate, is fixed onto the base (8). An optical fiber (2) is fixed onto the anchor member (5) by means of an anchoring material (6). The optical fiber (2) is aligned and optically coupled with the semiconductor laser element (1). A cut-out (9) is formed in the part of the base (8) corresponding to the anchoring material (6) (below the anchoring material (6)). Thus the anchor member (5) is fixed onto the base (8) so as to straddle the cut-out (9). Since the cut-out (9) is formed below the anchor member (5), a spot heater (10) or like can be used to heat the anchor member (5) from the bottom surface thereof. Thus, the anchoring material (6) on top of the anchor member (5) can be efficiently heated.

6 Claims, 14 Drawing Sheets

(A)

(B)

(C)

(A)

(B)

(A)

(B)

(C)

(A)

(B)

(A)

(B)

(A)

(B)

(A)

(B)

SEMICONDUCTOR LASER MODULE AND MANUFACTURING METHOD THEREFOR

TECHNICAL FIELD

The present invention relates to a semiconductor laser module mainly used in the field of optical communications, and to a manufacturing method thereof.

BACKGROUND ART

The semiconductor laser module is generally used as a light source of the signals and as an excitation light source of the optical fiber amplifier and the like in the optical communications.

FIG. 12 are figures showing the semiconductor laser module (100), FIG. 12A is a top view, and FIG. 12B is a side view. The semiconductor laser module (100) mainly comprises a semiconductor laser element (101), an optical fiber (102), a base (103) and so forth. The semiconductor laser element (101) is fixed onto the base (103). The optical fiber (102) is arranged on the base (103) and is fixed by means of an anchoring material (104), so as to be optically coupled with the emitted light from the semiconductor laser element (101). As the anchoring material (104), synthetic resin adhesives, solder, low melting glass or the like can be used.

In alignment/fixation of the optical fiber (102) to the semiconductor laser element (101), a passive aligning method or an active alignment method can be used. In recent years, for the semiconductor laser module used in the high speed communication at 10 Gb/s or more, the active alignment with which more precise adjustment can be made is mainly used. This active alignment is carried out as follows: the light-incident-side end of the optical fiber (102) is positioned so that it is optically coupled with the emitted light from the semiconductor laser element (101), and the laser light is monitored with a detector at the other end in this situation.

When the optical fiber (102) is fixed, the anchoring material (104), such as solder or low melting glass, is heated and melted by heating means such as a soldering iron, a laser or the like. The optical fiber (102) can be freely moved within the anchoring material (104) in the molten state. The position of the optical fiber (102) is adjusted by monitoring the value of the detected signal. When the detected signal has reached a sufficient value, the anchoring material (104) is cooled and the optical fiber (102) is fixed to a definite position.

FIG. 13A shows a situation in which a solder preform is heated with the laser light. As a conventional fixing method of the optical fiber (102), solder is used as the anchoring material (104) to fix the optical fiber (102), for example, as shown in FIG. 13A. As shown in FIG. 13A, the anchoring material (104), which is a solder preform, is arranged on the base (103), and is heated by irradiation of the laser light (105) emitted from a laser light irradiator (not shown) from above the anchoring material (104). The anchoring material (104) is heated and melted, and then the optical fiber (102) is fixed onto the base (103).

Since the material constructing the base (103) is generally constituted of CuW or the like which has high thermal conductivity, when the base is heated for a long time, the heat may propagate to other optical elements and may affect them adversely. For this reason, it is necessary to melt and fix the anchoring material (104) (the solder) with short-time heating. However, this approach will give a problem that the base member cannot be sufficiently heated within a time when the anchoring material (104) (the solder) is melted, and thus wetting between the anchoring material (104) (the solder) and the base (103) may become insufficient.

Another fixing method of the optical fiber is, for example, a method to heat the anchoring material such as a solder preform, low melting glass and the like with a heating wire, soft beam (light from a lamp such as a halogen lamp or the like, for example), a semiconductor laser, a YAG laser or the like (refer to Patent document 1 and Patent document 3, for example).

FIG. 13B shows a situation in which the anchoring material is heated by a heating element. As shown in FIG. 13B, a heating wire (111) is wound up around the lower part of the supporting element (112) for fixing the anchoring material (104) (the solder) thereon. When the optical fiber (102) is aligned and fixed, electric current is flown through the heating wire (111) and the temperature of the supporting element (112) itself is raised. The anchoring material (104) (the solder) is melted by the supporting element (112), and then the optical fiber (102) is fixed onto the supporting element (112).

There is a method for fixing the optical fiber, in which the optical fiber supporting element is made of an electric resistor, wherein the solder (the anchoring material) is heated with the resistor (refer to Patent document 2 and Patent document 4, for example).

FIG. 14A shows how the anchoring material is heated by a resistor. As shown in FIG. 14B, the resistor (122) is arranged on a substrate (121) and side pads (123) are provided on both ends of the resistor (122). The substrate (121) on which the side pads (123) and the resistor (122) are connected, is installed on the base (103). The optical fiber (102) is arranged on the resistor (122), and the anchoring material (104) (the solder) is provided thereon.

When electric current is applied to the side pads (123) provided on both ends of the resistor (122), the resistor (122) will generate heat. Thus, the anchoring material (104) (the solder) is melted. Then supply of the electric current is stopped, and the optical fiber (102) is fixed onto the resistor (122).

PRIOR ART DOCUMENTS

Patent Documents

[Patent document 1]
Japanese Utility Model Application Publication No. H3-16367
[Patent document 2]
Japanese Patent Application Publication (Translation of PCT Application) No. 2006-509254
[Patent document 3]
Japanese Patent Application Publication No. 2000-183445
[Patent document 4]
U.S. Pat. No. 6,164,837

SUMMARY OF THE INVENTION

Problems to be Solved by the Invention

In any of the methods given in Patent documents 1 to 4, however, the base may also be heated because the heated region is in contact with the base, and thus, other optical elements may be affected. There is also a problem that cost is needed for newly providing a heating mechanism to heat the supporting element (112) or the resistor (122). For these reasons, a method for heating efficiently the anchoring material and the portion of the base on which the anchoring material is arranged by a simple mechanism, is desired.

The present invention was made in view of such problems. It aims to provide a semiconductor laser module and the manufacturing methods thereof, wherein: the semiconductor laser module has a simple structure provided in the base or the like; owing to the simple structure, the anchoring material and the portion on which the anchoring material is fixed can be heated efficiently and the connection between the optical fiber and the anchor member can be strengthened; and thus the manufacturing and assembly costs can be reduced.

Means for Solving the Problems

The first invention for attaining the above-mentioned purpose is a semiconductor laser module, wherein an optical fiber and a light-emitting element are optically combined. Said semiconductor laser module comprises a base, a light-emitting element fixed to said base, an anchor member fixed onto said base, and an optical fiber fixed onto said anchor member and optically combined with said light-emitting element; wherein said optical fiber is fixed to said anchor member by means of an anchoring material, and a cut-out is formed in the part of said base situated below the portion of said anchor member on which said anchoring material is provided.

Said cut-out is a through-hole provided in said base, and said anchor member is provided so as to straddle said through-hole nearly in the same direction as the axial direction of said optical fiber. The width of said through-hole transverse to the axial direction of said optical fiber may be larger than the width of said anchor member transverse to the axial direction of said optical fiber.

A recess may be formed on a region of the bottom surface of said anchor member corresponding to the portion on which said anchoring material is arranged. Grooves may be formed in the regions of the bottom surface of said anchor member corresponding to the lateral sides of the portion on which said anchoring material is arranged.

Depressions may be formed on the positions of said base whereon said anchor member is installed, and thereby positioning of said anchor member on said base may become possible.

According to the first invention, a cut-out is formed in the part of the base corresponding to the portion where the anchoring material for fixing the optical fiber is provided, and so a vacant space is formed below the portion of the anchor member on which the anchoring material is arranged. Accordingly, the anchor member can be directly treated with heat or the like locally, from below the anchor member on which the anchoring material is provided. Accordingly, both the anchoring material and the anchor member can be heated efficiently, and thus, the present invention excels in workability and connectivity.

Additionally in the present case, special resistors or heating wires or the like do not need to be provided; and connections of electrodes or the like, for sending electric current through resistors or heating wires etc., are not necessary. Also, material of the base (material of the base surface) is not necessarily insulators. For these reasons, the present invention can excel in workability, number of parts can be reduced, and the selection range of the material can be extended.

In the case where the cut-out is a through-hole, the anchor member is provided so as to straddle the through-hole nearly in the same direction as the axial direction of the optical fiber, and the width of said through-hole transverse to the axial direction of said optical fiber is larger than the width of the anchor member, the through-hole is exposed at both sides of the anchor member. Thus, an L-shaped heating unit or the like can be inserted from above the base, and the bottom surface of the anchor member can be heated without interference between the heating unit or the like and the optical fiber.

If a recess is provided on the bottom surface of the anchor member corresponding to the portion on which an anchoring material is arranged, the anchoring material can be more easily heated from the bottom surface of the anchor member. Furthermore, if grooves are formed in the regions of the bottom surface of the anchor member corresponding to the lateral sides of the portion on which the anchoring material is arranged, heat propagation to both sides of the anchor member can be suppressed when the anchor member is heated from the bottom surface. Accordingly, the heat propagation from the anchor member to the base can be suppressed.

If the thermal conductivity of the anchor member is 100 W/m·K or more, and an intermediate member with less than 100 W/m·K thermal conductivity is provided between the anchor member and the base, the anchoring material can be heated in a short time when the anchor member is heated from the bottom surface, and at the same time, heat propagation from the anchor member to the base can be suppressed. If the thermal conductivity of the anchor member is less than 100 W/m·K, only the temperature near the heated region of the anchor member can be efficiently raised when the anchor member is heated from the bottom surface. Accordingly, the heat propagation from the anchor member to the base can be suppressed.

If the anchor member is UV light-permeable and the anchoring material is a UV light curing resin, the anchoring material can be hardened by UV light irradiation from below the anchor member.

If depressions are formed on the anchor member installation positions of the base, the anchor member can be fixed with certainty at definite positions of the base.

The second invention is a manufacturing method of a semiconductor laser module wherein an optical fiber and a light-emitting element are combined optically. Said method comprises steps of: adopting a base whereon a light-emitting element and an anchor member are fixed; installing an optical fiber onto said anchor member so as to be optically coupled with said light-emitting element; providing an anchoring material on said optical fiber; treating said anchoring material with heat or with UV light irradiation from below said anchor member by utilizing a cut-out provided in the part of said base corresponding to the portion on which said anchoring material is arranged: and fixing said optical fiber onto said anchor member by means of said anchoring material.

According to the second invention, a manufacturing method of the semiconductor laser module having a simple structure can be obtained. The method excels in workability, can treat efficiently the anchoring material for fixing the optical fiber with heat or the like, and can suppress heat propagation to the base.

Effect of the Invention

The present invention can provide a semiconductor laser module and a manufacturing method thereof, wherein the semiconductor laser module has a simple structure provided in the base or the like. Thereby, the anchoring material and the portion of the anchor member for fixing the anchoring material can be heated efficiently; the connection strength of the optical fiber to the anchor member is increased; and the manufacturing cost and the assembling cost can be reduced.

BRIEF DESCRIPTION OF THE DRAWINGS

FIG. 7A shows a method using a spot heater, and FIG. 7B shows a method using a laser light irradiator.

FIGS. 10 are sectional views showing variations of the cut-out portion or the like.

FIG. 14A is a perspective view showing a conventional semiconductor laser module (120); and FIG. 14B shows structures of substrate (121) or the like.

EMBODIMENTS OF THE INVENTION

Figure 1:
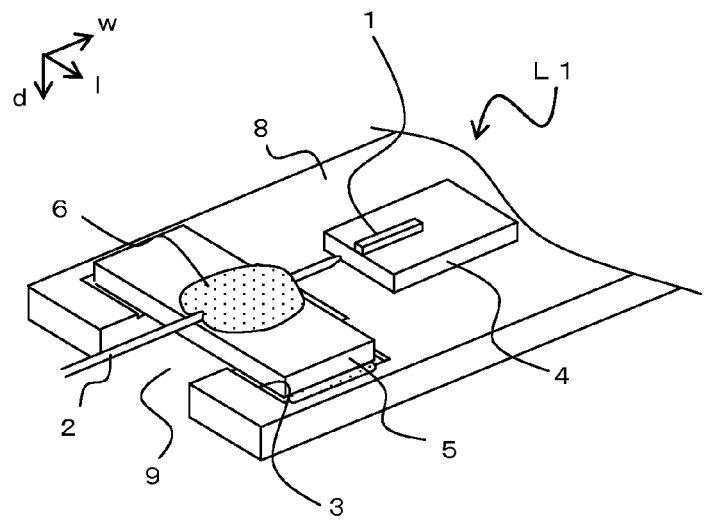
FIGS. 1A, 1B, and 1C are a perspective view, a top view, and a side view of the semiconductor laser module (L1) according to the first embodiment of the present invention, respectively.
Figure 1:
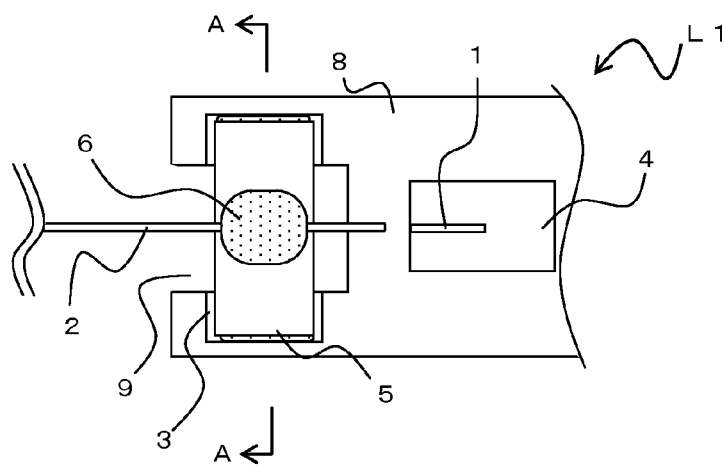
Figure 1:
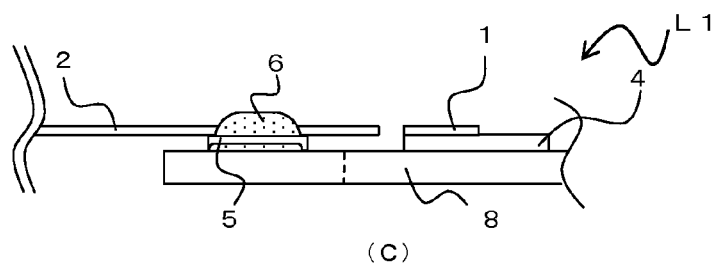

Hereafter, embodiments of the present invention are described referring to drawings. FIG. 1A is a perspective view showing a semiconductor laser module (L1), FIG. 1B is a top view of the semiconductor laser module (L1), and FIG. 1C is a side view of the semiconductor laser module (L1). The semiconductor laser module (L1) mainly comprises a semiconductor laser element (1), an optical fiber (2), an anchor member (5), an anchoring material (6), and a base (8). Furthermore, a photodetector for monitoring laser output (not shown) and so forth are provided.

The base (8) is, for example, about 6 mm in width (in the direction of 1 in the figure), about 10 mm in length (in the direction of w in the figure), and about 1 mm in thickness (in the direction of d in the figure); and CuW can be used as a material thereof, for example. The base (8) is fixed on a Peltier element (not shown).

A light-emitting element mount (4) is fixed onto the base (8). Furthermore, a semiconductor laser element (1) is fixed onto the light-emitting element mount (4). That is, the semiconductor laser element (1) is fixed above the base (8). The semiconductor laser element (1), which is a light-emitting element, is a laser diode that emits laser light.

On the base (8), an anchor member (5) is fixed by means of solder or the like. Depressions (3) are formed at the positions of the base (8) on which the anchor member (5) is fixed. That is, the anchor member (5) is fixed onto the base (8) by means of the solder or the like, in the situation that the anchor member (5) is fitted in the depressions (3). Accordingly, the installation position of the anchor member (5) is determined by the depressions (3). The anchor member (5) may be fixed onto the base (8) by means of the solder or the like only, or by means of fitting in the depressions (3) only. The anchor member (5) may be fixed to the base (8) by means of a metal piece or the like, and when possible, welding, screw clamping or the like may be used.

The anchor member (5) is in the shape of a nearly rectangular plate. Although the size of the anchor member (5) may be designed suitably from the experiments conducted by the inventors and others on some material systems, the width (in the direction of w in the figure) should be determined by the strength of fixation of the optical fiber (2) onto the anchor member (5). Preferably, it is 1 mm to 3 mm, and for example, is about 2 mm. Thickness (in the direction of d in the figure) is determined between the minimum value at which the anchor member (5) is not broken by the force caused by migration of the optical fiber (2) or by the heat hysteresis, under the condition that the optical fiber (2) is fixed, and the maximum value at which the portion on which the anchoring material is fixed is uniformly heated. Preferably, the thickness is 0.5 to 2 mm, and for example, is about 1 mm. Length (in the direction of 1 in the Figure) is larger than that of the cut-out in the base (8) (mentioned later), and thus is long enough for the anchor member's both ends to be certainly fixed on the base (8). Preferably, the length is 3 mm to 5 mm, and for example, is about 4 mm. The length of the anchor member (5) is desirably larger than that of the high temperature region in heat distribution at the time of heating (mentioned later).

The material of the anchor member (5) is selected from among the materials which do not react with the base (8) or with the anchoring material and have the thermal conductivity of 0.6-60 W/m·K, such as ceramics (inorganic solid) including zirconia, alumina, silicon carbide, silicon nitride or the like and low heat conductivity alloys like KOVAR (registered trademark), for example. That is, materials with poor thermal conductivity (less than 100 W/m·K) can be used as the anchor member (5).

The optical fiber (2) is fixed onto the anchor member (5). The optical fiber (2) is, for example, a lensed fiber. The optical fiber (2) is fixed onto the anchor member (5) by means of the anchoring material (6). In this case, the optical fiber (2) is aligned and thus optically coupled with the semiconductor laser element (1).

When long-term reliability is taken into consideration, solder, low melting glass or the like is more preferable than synthetic resin adhesives as the anchoring material (6). In this embodiment, low melting glass is desirable to be used because of its adhesiveness to ceramics and its thermal expansion coefficient similar to that of the optical fiber.

A cut-out (9) is formed in the part of the base (8) corresponding to the anchoring material (6) (below the anchoring material (6)). That is, the anchor member (5) is fixed onto the base (8) so that it straddles the cut-out (9). The anchor member (5) is installed so that it straddles the cut-out (9) in the direction nearly vertical to the axial direction of the optical fiber (2). A vacant space is formed by the cut-out (9) under the anchor member (5) (in the region corresponding to the anchoring material (6)). The shape of the cut-out (9) is not restricted to the illustrated examples, however, various shapes such as rectangle, semicircle, half-ellipse, triangle, polygon, etc. can be selected.

Figure 2:
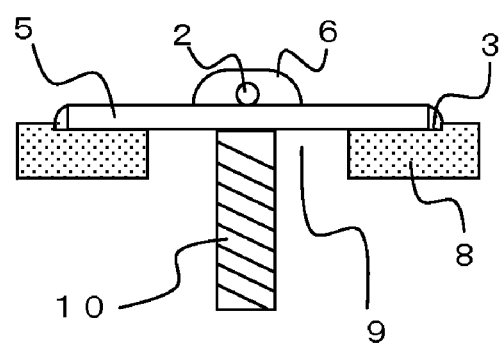
FIG. 2A is a sectional view of FIG. 1B at the A-A line.
FIG. 2B is a top view of FIG. 2A.
Figure 2:
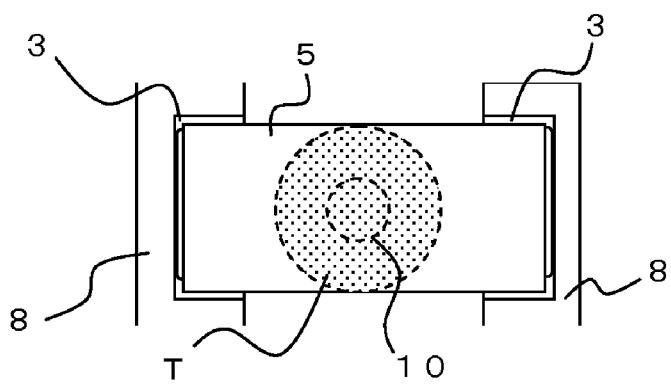

FIG. 2A is a sectional view of FIG. 1B at the A-A line. A cut-out (9) is formed under the anchor member (5), as described above. Thus, as shown in FIG. 2A, the anchor member (5) can be heated from the bottom surface of the anchor member (5) using a spot heater (10) or the like. Accordingly, the anchoring material (6) on the anchor member (5) can be efficiently heated.

FIG. 2B is a top view of FIG. 2A, where the anchoring material (6) and the optical fiber (2) are not shown. As shown in FIG. 2B, when the anchor member (5) is heated by a spot heater from below, the anchor member (5) is heated locally. Thus, due to heat conduction through the anchor member (5), the anchoring material (6) on the upper surface of the anchor member (5) is heated. Accordingly, the anchoring material (6) is melted and subsequently solidified by cooling, so that the optical fiber (2) can be fixed onto the anchor member (5).

Since the anchor member (5) has low thermal conductivity, the high temperature region T of the anchor member (5) does not extend to the whole anchor member (5) during the heating time for melting the anchoring material (6) completely (for example, for several seconds to tens of seconds), and so the neighborhood of the junction area between the anchor member (5) and the base (8) does not become high temperature region as shown in FIG. 2B. Thus, heat propagation to the base (8) is suppressed. That is, the width of the cut-out (9) may only be larger than the width of the high temperature region T during the heating time required for the anchoring material (6) to be melted, and the anchor member (5) may only be longer than the cut-out (9) in order to straddle the cut-out (9).

According to the first embodiment, the anchoring material (6) can be efficiently heated owing to a simple structure in the base (8). Since a vacant space is formed under the anchor member (5) due to the cut-out (9), the anchor member (5) can be heated from the bottom surface. Furthermore, since the anchoring material (6) is heated through the heated anchor member (5), the anchor member (5) is in a sufficiently heated state when the anchoring material (6) reached a molten state, and the wetting between the anchoring material (6) and the anchor member (5) is excellent. For this reason, good connectivity between the anchoring material (6) and the anchor member (5) can be obtained.

Furthermore, since the thermal conductivity of the anchor member (5) is low, the whole body of the anchor member (5) does not become a high temperature region within the heating time required for the anchoring material (6) to be melted. Since only both ends of the anchor member (5) are connected to the base (8) due to the existence of the cut-out (9), heat propagation from the anchor member (5) to the base (8) is suppressed. Furthermore, since depressions (3) are formed on the base (8), positioning of the anchor member (5) is easy.

Figure 3:
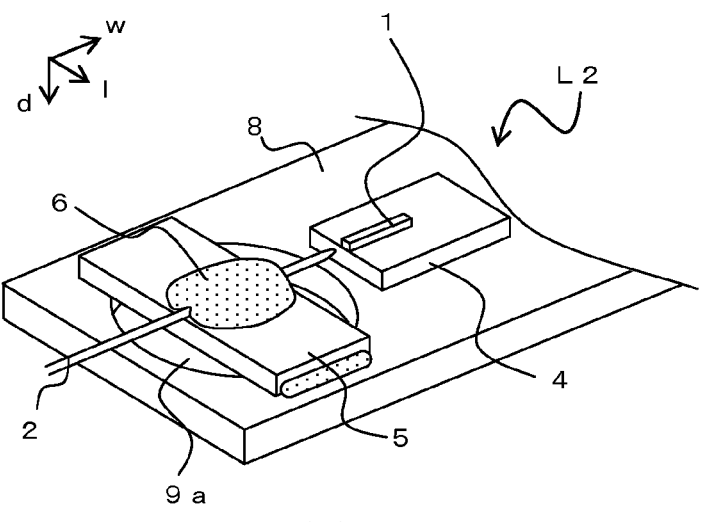
FIGS. 3A, 3B and 3C are a perspective view, a top view and a side view of the semiconductor laser module (L2) according to the second embodiment of the present invention, respectively.
Figure 3:
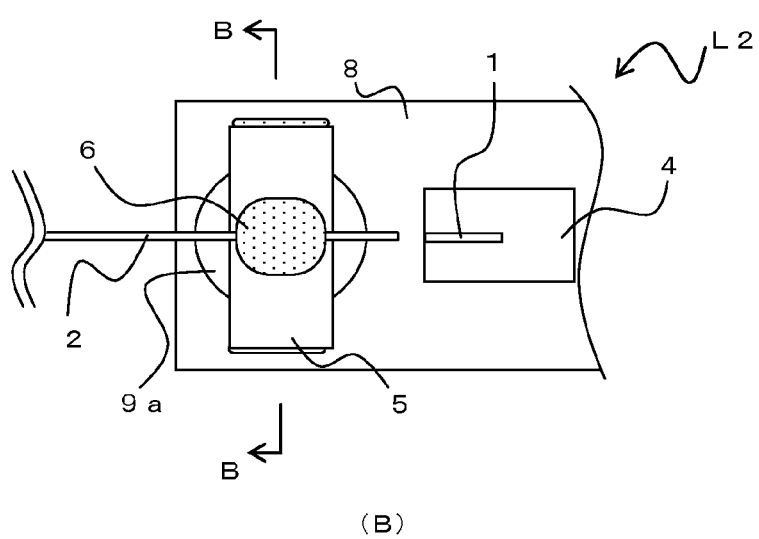
Figure 3:
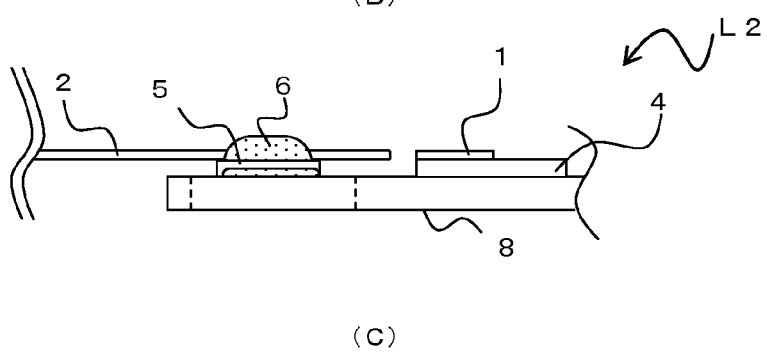

Next, the second embodiment is described. FIG. 3A is a perspective view showing the semiconductor laser module (L2); FIG. 3B a top view of the semiconductor laser module (L2); and FIG. 3C a side view of the semiconductor laser module (L2). In the following explanation, as to the components playing the same function as in FIG. 1, the same symbols as in FIG. 1 are attached and duplicate explanation is omitted. In the following figures, the depressions (3) are not shown. The semiconductor laser module (L2) has approximately the same constitution as the semiconductor laser module (L1), however, the concrete embodiment of the cut-out (9a) is different.

Although the cut-out (9a) plays the same function as the cut-out (9) in the semiconductor laser module (L1), the cut-out (9a) differs to the cut-out (9) in that the cut-out (9) has an opening on one side, however, the cut-out (9a) is in a form of a through-hole. Similar to the case of cut-out (9), the form of the cut-out (9a) is not restricted to the illustrated example but is selectable from among various forms such as a rectangle, a semicircle, a half-ellipse, a triangle, and a polygon. The diameter (length) of the cut-out (9a) in the shape of a through-hole is the length which can maintain mechanical strength of the anchor member (5).

According to the second embodiment, the same advantages as the first embodiment can be obtained. Since the cut-out (9a) is a through-hole, deformation of the base (8) or the like can be prevented with more certainty. There is a possibility on the cut-out (9) that the base (8) may be twisted because one side of the base (8) is discontinuous, and therefore, the cut-out (9a) is more preferable than the cut-out (9). Accordingly, the cases wherein the cut-out (9a) is adopted are explained in the following embodiments.

Figure 4:
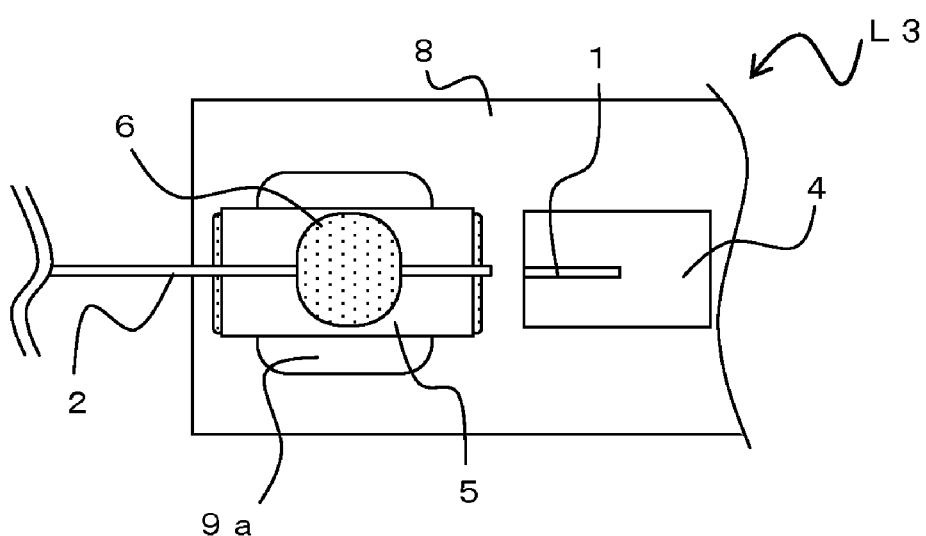
FIG. 4 is a top view of the semiconductor laser module (L3) according to the third embodiment of the present invention.

Next, the third embodiment is described. FIG. 4 is a top view showing the semiconductor laser module (L3). The semiconductor laser module (L3) has approximately the same constitution as the semiconductor laser module (L2), however, the arrangement direction of the anchor member (5) is different.

The anchor member (5) of the semiconductor laser module (L3) is fixed so that it straddles the cut-out (9a) in nearly the same direction as the axial direction of the optical fiber (2). That is, the anchor member (5) is fixed onto the base (8) at the front and rear sides of the cut-out (9a) in the axial direction of the optical fiber (2). In this case, the width of the cut-out (9a) transverse to the axial direction of the optical fiber (2) (that is, the width of the cut-out (9a) in nearly the vertical direction to the axial direction of the optical fiber (2)) is larger than the width of the anchor member (5) (the width of the anchor member (5) in nearly the vertical direction to the axial direction of the optical fiber (2)). Accordingly, at both sides of the anchor member (5), the cut-out (9a) is exposed on the upper surface of the base (8).

Thus, an L-shaped heating means can be inserted below the anchor member (5) from above the base (8) or from a side of the base (8), and the anchor member (5) can be heated from underneath. In this case, because the heating means need not be inserted from below the base (8), alignment/fixation of the optical fiber (2) can be carried out, even after the semiconductor module is incorporated into a package and is fixed to it. Since the optical fiber (2) does not exist in the openings of the cut-out (9a) at both sides of the anchor member (5), the heating means does not interfere with the optical fiber (2).

According to the third embodiment, similar advantages to the first and second embodiments can be obtained. The bottom surface of the anchor member (5) can be heated using an L-shaped heating means inserted from above the base (8), and thus the heating means does not interfere with the optical fiber (2).

Additionally, as the anchor member (5), materials with high thermal conductivity but having no reactivity with the base (8) and with the anchoring material (6) may also be used. In this case, the anchor member (5) can also be selected from among metals such as a copper plate, alloys such as CuW, ceramics such as aluminum nitride and the like, which have thermal conductivity of 100 W/m·K or more.

For example, the material which has similar thermal expansion coefficient to that of the base (8) or the material identical to that of the base (8) can be used. The anchoring material (6) is selected from solder or low melting glass as described above. However, when the material with high thermal conductivity is used as the anchor member (5), it is desirable to select solder due to its connectivity to CuW. As for the surface of the anchor member (5), surface roughening treatment is desirable to be performed on it, so that its connectivity to the solder may be improved.

As for the size of the anchor member (5) with high thermal conductivity, nearly the same size as in the case of low thermal conductivity can be used.

When the anchor member (5) with high thermal conductivity is used, it may only be fixed to the base (8) by YAG welding or the like.

Figure 5:
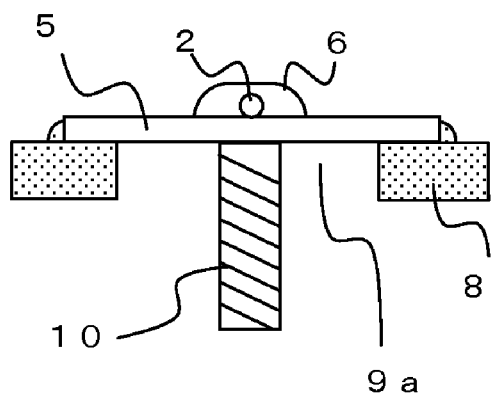
FIG. 5A is a sectional view of the semiconductor laser module (L2)
FIG. 5B is a top view of FIG. 5A.
Figure 5:
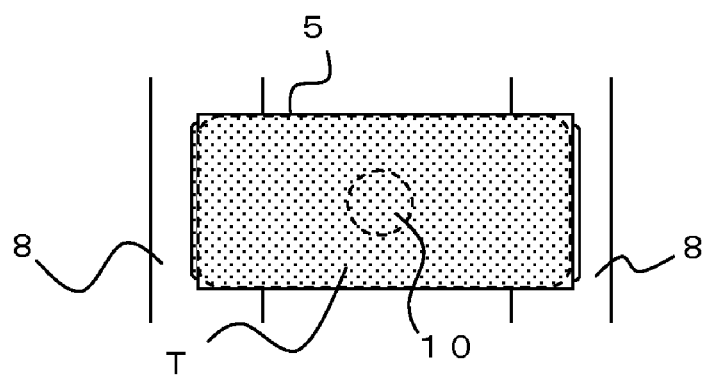

FIG. 5A is a sectional view of the semiconductor laser module (L2), in the case wherein the anchor member (5) with high thermal conductivity is adopted. As described above, the cut-out (9a) is formed under the anchor member (5). Accordingly, as shown in FIG. 5A, the anchor member (5) can be heated from the bottom surface of the anchor member (5) using a spot heater (10) or the like. Accordingly, the anchoring material (6) on the anchor member (5) can be heated efficiently.

FIG. 5B is the top view of FIG. 5A, wherein the anchoring material (6) and the optical fiber (2) are not shown. When the anchor member (5) is heated (for example, for several seconds) with the spot heater (10) from below the anchor member (5), as shown in FIG. 5B as an example, it is entirely heated (see the high temperature region T shown in the figure). Accordingly, the anchoring material (6) on the upper surface of the anchor member (5) is heated immediately due to heat conduction through the anchor member (5). Accordingly, the anchoring material (6) is melted and solidified by subsequent cooling, so that the optical fiber (2) can be fixed onto the anchor member (5).

Under the present situation, because the anchor member (5) has high thermal conductivity, melting of the anchoring material (6) is completed immediately after the start of heating. Because of high thermal conductivity of the anchor member (5), the end regions of the anchor member (5), which are connected to the base (8), also become high temperature regions in a short time.

For example, if the anchor member (5) is made from a material with high thermal conductivity, and if its thickness is set to be large (more than 3 mm), there is a possibility that it can give adverse effects to other optical elements, because the heat may propagate easily to the base material at the time of heating. Accordingly, near the connection regions of the base (8) with the anchor member (5), a heat dissipation structure (a heat sink, etc.) for releasing the heat near the connection regions may be provided. Near the connection regions of the base (8) with the anchor member (5), the width or thickness of the anchor member (5) may be increased, so that its heat capacity may be increased.

Figure 6:
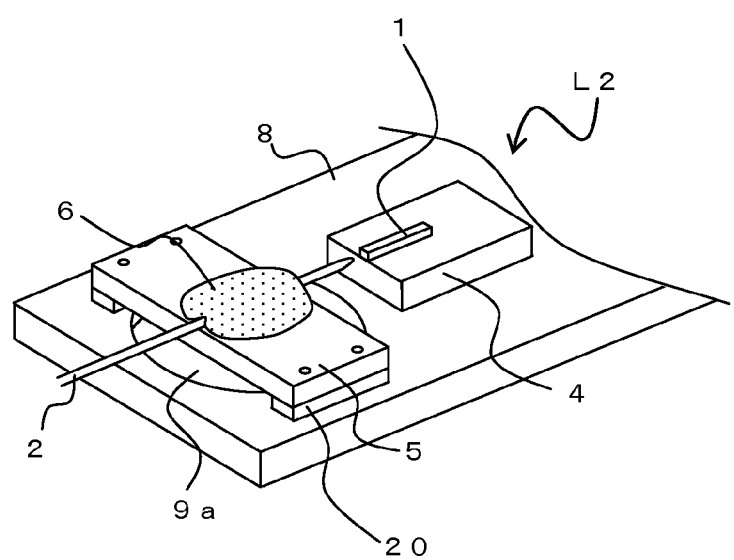
FIG. 6 is a perspective view showing a variation of the semiconductor laser module (L2).

As shown in FIG. 6, intermediate members (20) may be provided. In the example shown in FIG. 6, sheet-shaped intermediate members (20) 10 to 50 μm thick made from a material with low thermal conductivity (less than 100 W/m·K) and with small thermal expansion coefficient, such as silicon nitride, are inserted between the anchor member (5) and the base (8). In this case, the laminated structure of the anchor member (5) and the intermediate members (20) may be fixed by fitting structures provided on the base (8), or may be fixed by metal pieces or the like. The laminated structure may be fixed in a way wherein its both ends are covered by solder or silver solder. Alternatively, if possible, other methods such as welding or screw clamping may be used When the anchor member (5) with high thermal conductivity is used, the portion of the anchor member (5) on which the anchoring material (6) is installed can be heated immediately because of its high thermal conductivity. If the intermediate members (20) are provided, heat propagation from the anchor member (5) to the base (8) can be suppressed.

Next, a manufacturing method of the semiconductor laser module according to the present invention is explained. First, the base (8) on which the semiconductor laser element (1) and the anchor member (5) are fixed is adopted, and the optical fiber (2) is roughly positioned on the anchor member (5). As described above, the cut-out (9 or 9a) is positioned below the part of the anchor member (5) corresponding to the portion on which the anchoring material (6) is provided.

Next, the anchoring material (6) such as solder or low melting glass (a preform) is applied (placed) on the anchor member (5) around the optical fiber (2). In this situation, the bottom surface of the portion of the anchor member (5) on which the optical fiber (2) should be fixed (namely, the portion corresponding to the anchoring material (6)) is heated locally via the cut-out (9 or 9a) in the base (8).

Figure 7:
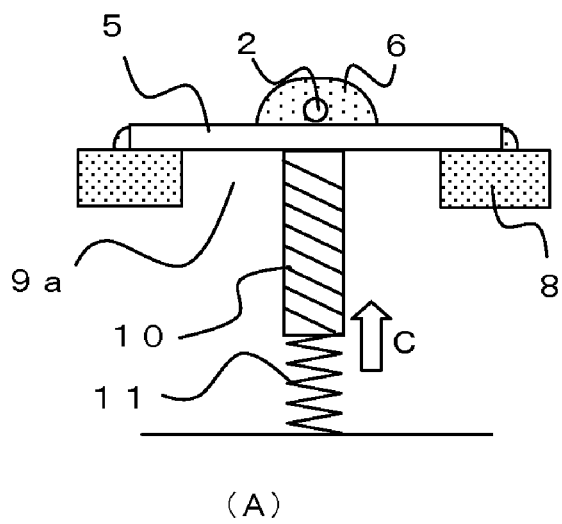
FIGS. 7 show heating methods of the anchoring material (6)
Figure 7:
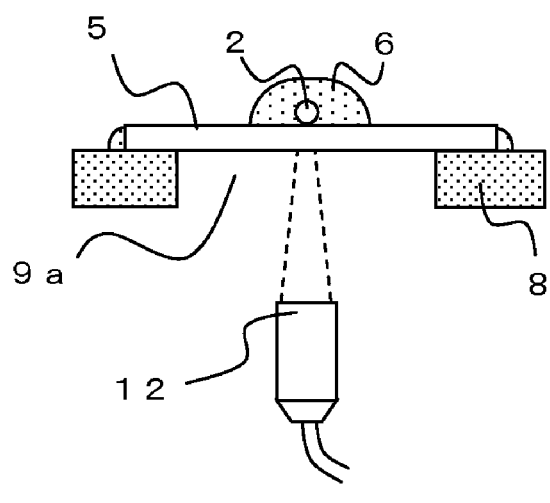

FIG. 7 show how the anchor member (5) is heated. In FIG. 7, an example of the semiconductor laser module (L2) on which the anchor member (5) is fixed is shown. As shown in FIG. 7A, a spot heater (10) is abutted against the anchor member (5) from its back side via the cut-out (9a) in the base (8). The spot heater (10) is desirably pressed in the direction to abut against the back surface of the anchor member (5) (the direction of an arrow C in the figure) by a spring (11). When the spot heater (10) is abutted against the anchor member (5), it is installed carefully so that the anchor member (5) may not be deformed or damaged by the pressure at the time of abutting. In this situation, the anchor member (5) is heated by the spot heater (10), and the anchoring material (6) becomes molten state by the heat from the anchor member (5).

In this situation, laser light is emitted from the semiconductor laser element (1), and the light emitted from the other end of the optical fiber (2) is monitored by a photodetector in order to check the output of the light received at the optical device connection end of the optical fiber (2). Based on this procedure, the position of the optical fiber (2) is adjusted. When the output value detected by the photodetector reaches a predetermined value (mostly the maximum value), the optical fiber (2) is temporarily fixed at that position, and heating by the spot heater (10) is finished. Taking the contraction of the anchoring material (6) into consideration, the position may be shifted at the temporary fixing.

When the anchoring material (6) is cooled, the optical fiber (2) is fixed onto the anchor member (5) by means of the anchoring material (6). When the position of the optical fiber (2) is readjusted, repositioning can be realized by repetition of the heating steps described above.

The heating method of the anchor member (5) is not restricted to the example given in FIG. 7A. For example, as shown in FIG. 7B, the spot heater (10) may be replaced by a laser light irradiator (12) as a heating means. Even if the laser light irradiator (12) is adopted, it can irradiate the anchor member (5) with the laser light from the back side via the cut-out (9a) in the base (8). That is, the anchor member (5) can be heated from the bottom surface side. Accordingly, the connection portion of the anchoring material (6) can be heated and the optical fiber (2) can be fixed by means of the anchoring material (6).

Figure 8:
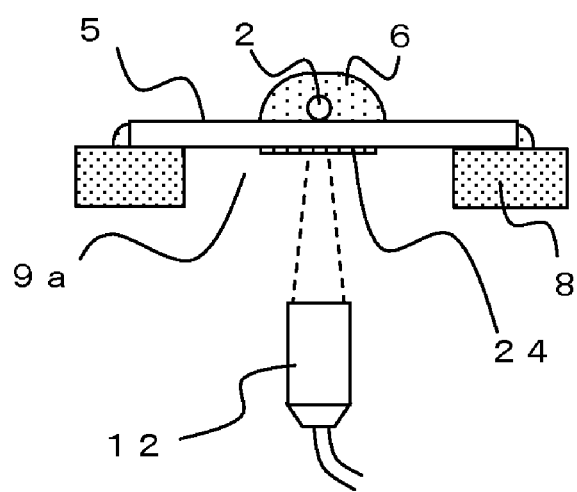
FIG. 8 shows another heating method of the anchoring material (6).

As shown in FIG. 8, when the laser light irradiator (12) is used as the heating means, a coating material (24), which is a material for absorbing the laser light, may be provided at the laser light irradiated region on the back surface of the anchor member (5). If the coating material (24) is provided, heating efficiency can be further improved. If the UV light irradiation laser is adopted as the heating means and Cu or the like is used as the anchor member (5), the coating material (24) is not necessarily applied, since Cu itself has a high absorbance.

As the means for local heating, lamp light from a halogen lamp, hot gas or the like may be used other than the illustrated examples. When the anchoring material (6) is low melting glass, the gas used as the hot gas is air or inert gas, and when the anchoring material (6) is solder, the gas having an anti-oxidant effect is preferably used.

When the anchoring material (6) is melted and the optical fiber (2) is fixed, the anchor member (5) may be heated not only from below, but also a part of the anchor member (5) around the anchoring material (6) may be simultaneously heated from above the anchor member (5) etc., using a heating unit. Accordingly, the anchoring material (6) is heated from both the upper and back sides of the anchor member (5). Thus, the anchoring material (6) can be heated more promptly and with more certainty, and thus the connectivity between the anchoring material (6) and the anchor member (5) or between the anchoring material (6) and the optical fiber (2) can be improved.

Figure 9:
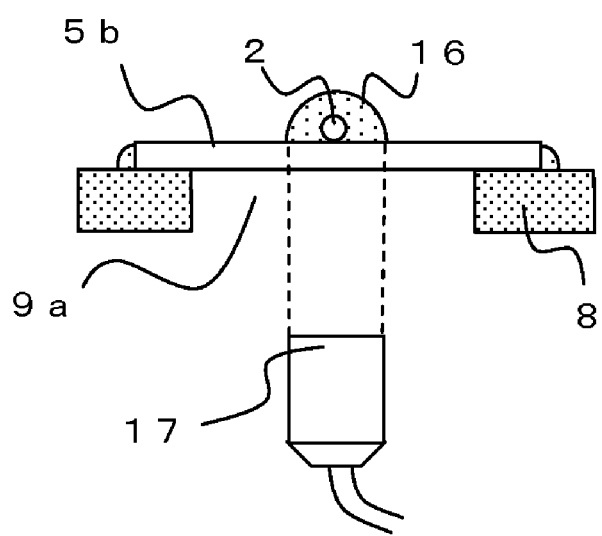
FIG. 9 shows the anchoring material (6) being irradiated with UV light.

As shown in FIG. 9, UV light curing resin (for example, resin of an epoxy system or an acrylate system) may be used as the anchoring material (16). In this case, an anchor member (5b) made from UV light-permeable material (for example, boro-silicated glass, quartz or the like) may be used. When the anchor member (5b) is irradiated with UV light from the UV light irradiator (17) via the cut-out (9a), UV light penetrates the anchor member (5b) and irradiates the anchoring material (16). The anchoring material (16) is cured by UV light and the optical fiber (2) can be fixed.

Figure 10:
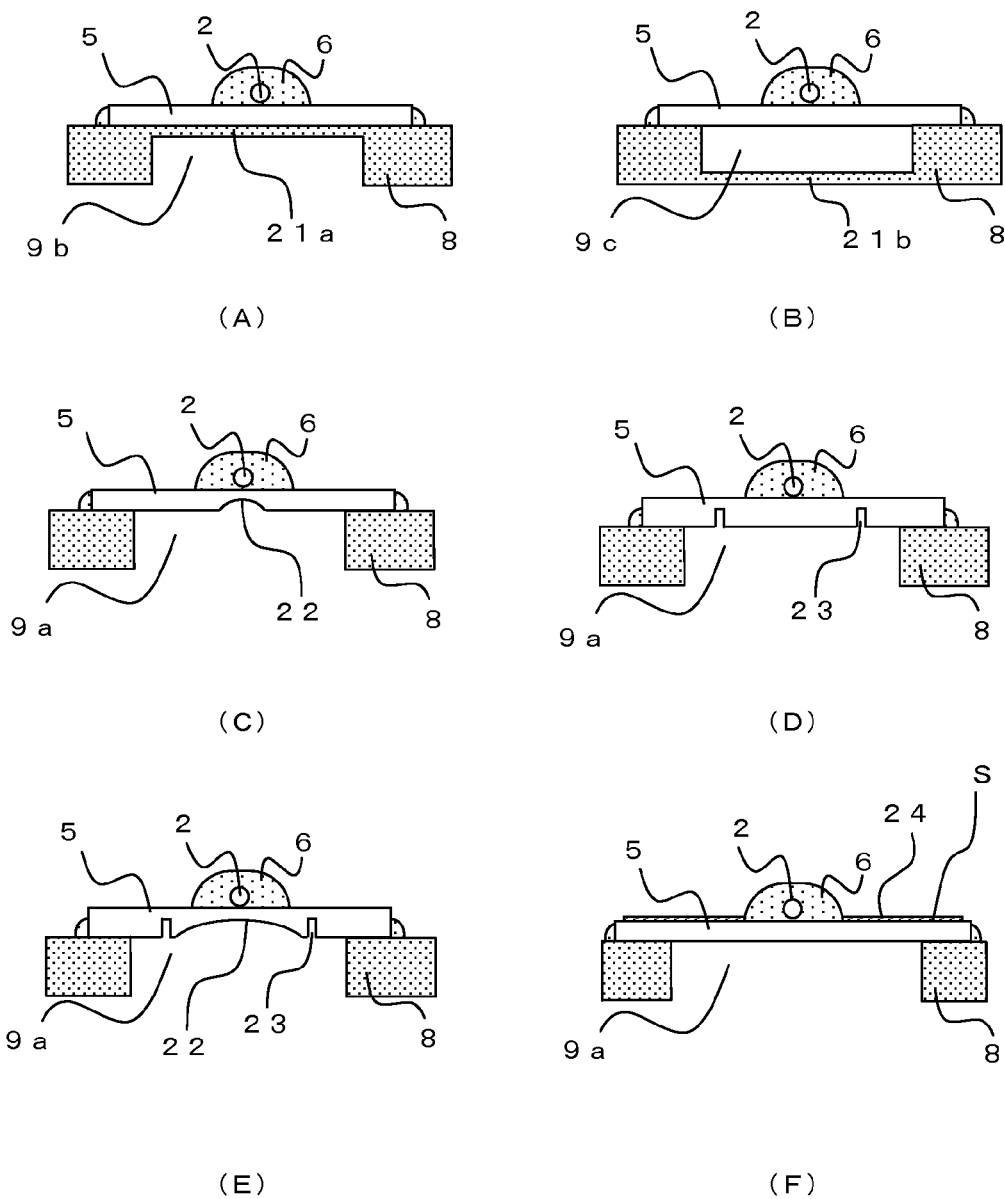

Next, various variations of the cut-out and the anchor member are explained. FIG. 10A and FIG. 10B are figures showing other forms of the cut-out. As described above, the cut-out may be in any form as long as heating etc. can be carried out from below the anchor member (that is, as long as a vacant space for carrying out heating etc. is formed).

For example, as shown in FIG. 10A, the cut-out (9b) may be formed under the part of the base (8) above which the anchoring material (6) for fixing the optical fiber (2) is placed. The cut-out (9b) does not thoroughly penetrate the upper and bottom surfaces of the base (8), but a thin-walled portion (21a) is formed. That is, the cut-out (9b) is a recess formed on the back side so that thickness of the base is thin locally. In this case, the bottom surface of the thin-walled portion (21a) may be heated from the cut-out (9b). A heat conductive paste or the like is desirably applied between the thin-walled portion (21a) and the anchor member (5), so that heat can easily propagate to the anchor member (5) from the thin-walled portion (21a).

Furthermore, as shown in FIG. 10B, the cut-out (9c) may be formed under the part of the base (8) above which the anchoring material (6) for fixing the optical fiber (2) is placed. The cut-out (9c) has a thin-walled portion (21b), and a vacant space to heat the anchor member (a recess or a groove) is formed between the thin-walled portion (21b) and the anchor member (5). In this case, a heating means may be inserted from the lateral side of the cut-out (9c) (in the axial direction of the optical fiber (2), that is, in the direction vertical to the page in FIG. 10B). Accordingly, the depth of the cut-out (9c) requires the size large enough at least for a heating means such as a spot heater or the like to be inserted into it.

In the case shown in FIG. 10B, when an optical means such as a laser or the like is used as a heating means, a reflection portion such as a mirror which bends the optical axis about 90 degrees may be provided in the cut-out (9c) directly under the solder fixing portion, so that the anchor member can be irradiated with the light emitted from the lateral side of the cut-out (9c).

Figure 11:
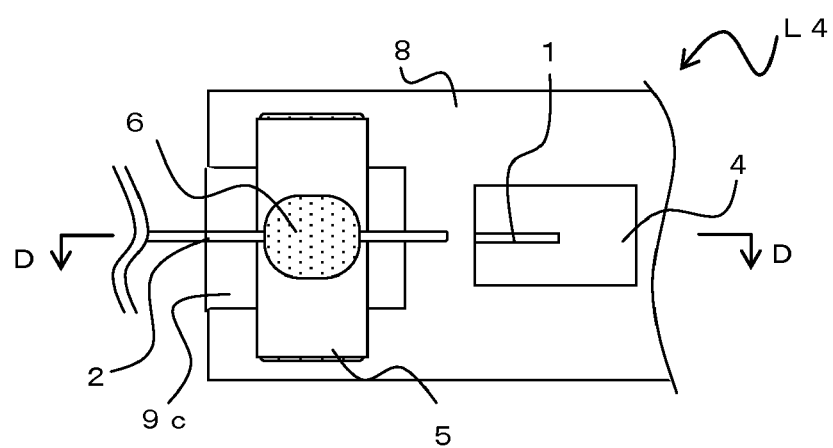
FIG. 11A is a top view of the semiconductor laser module (L4) according to an example of the 4th embodiment of the present invention.
FIG. 11B is a sectional view of FIG. 11A at the D-D line.
Figure 11:
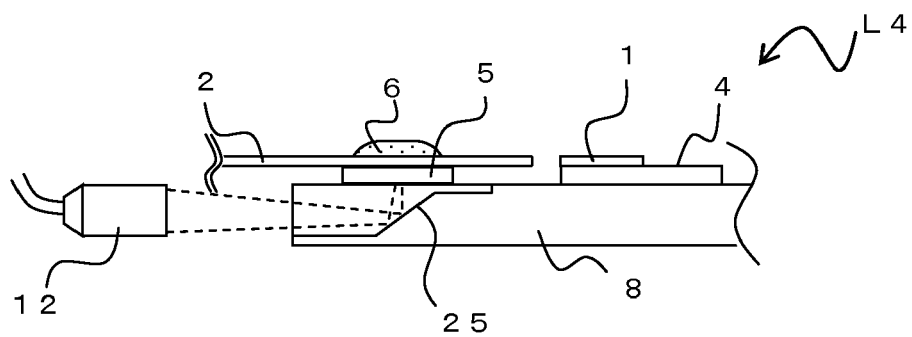
Figure 12:
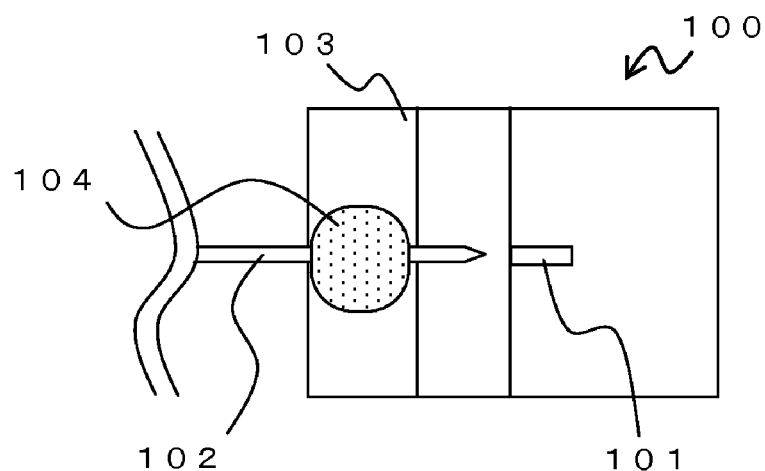
FIG. 12A is a top view of a conventional semiconductor laser module (100)
FIG. 12B is its side view.
Figure 12:
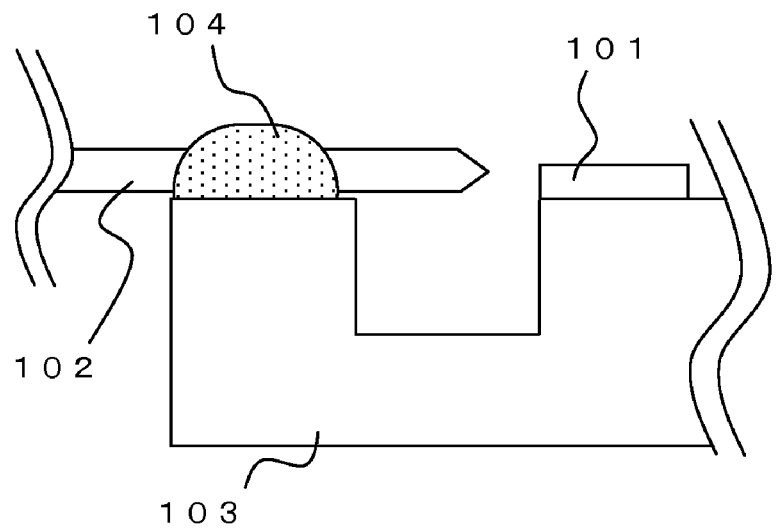
Figure 13:
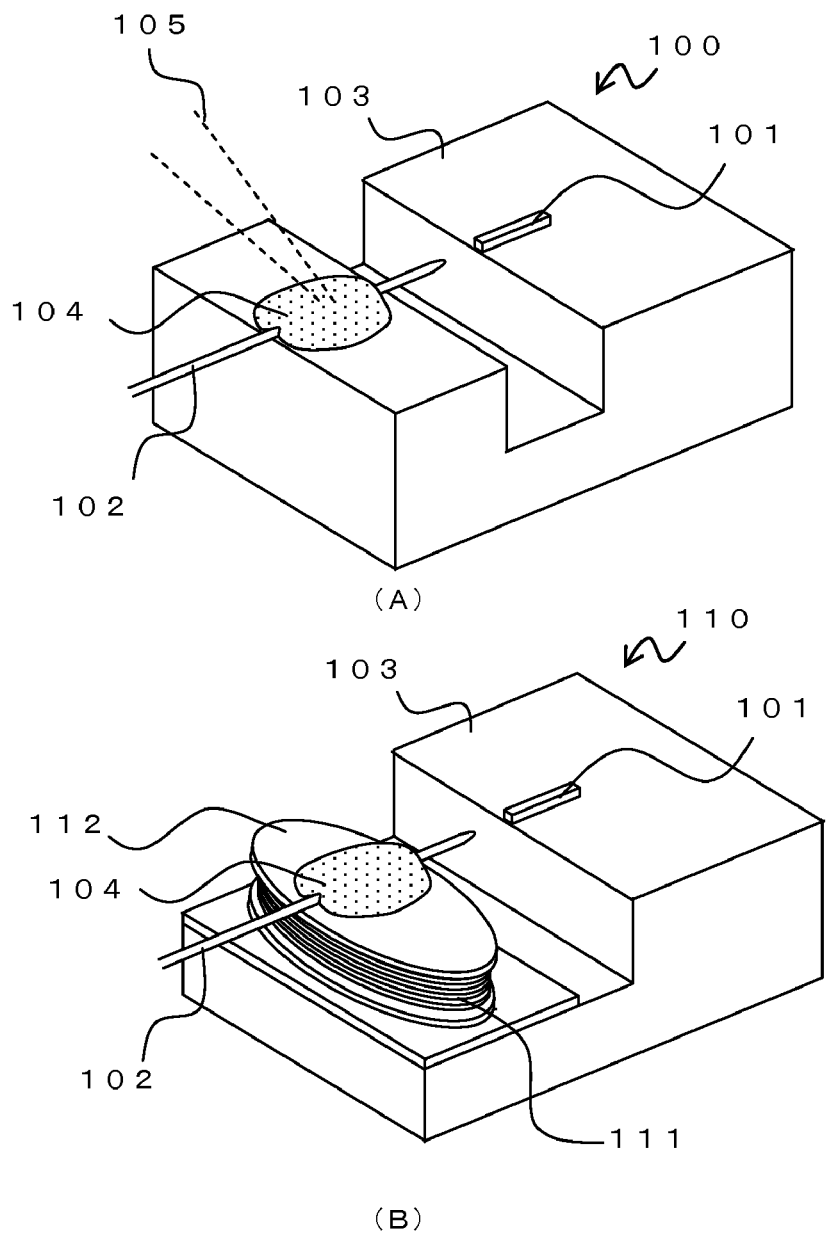
FIG. 13A shows a solder-heating method of a conventional semiconductor laser module (100)
FIG. 13B shows a solder-heating method of a conventional semiconductor laser module (110).
Figure 14:
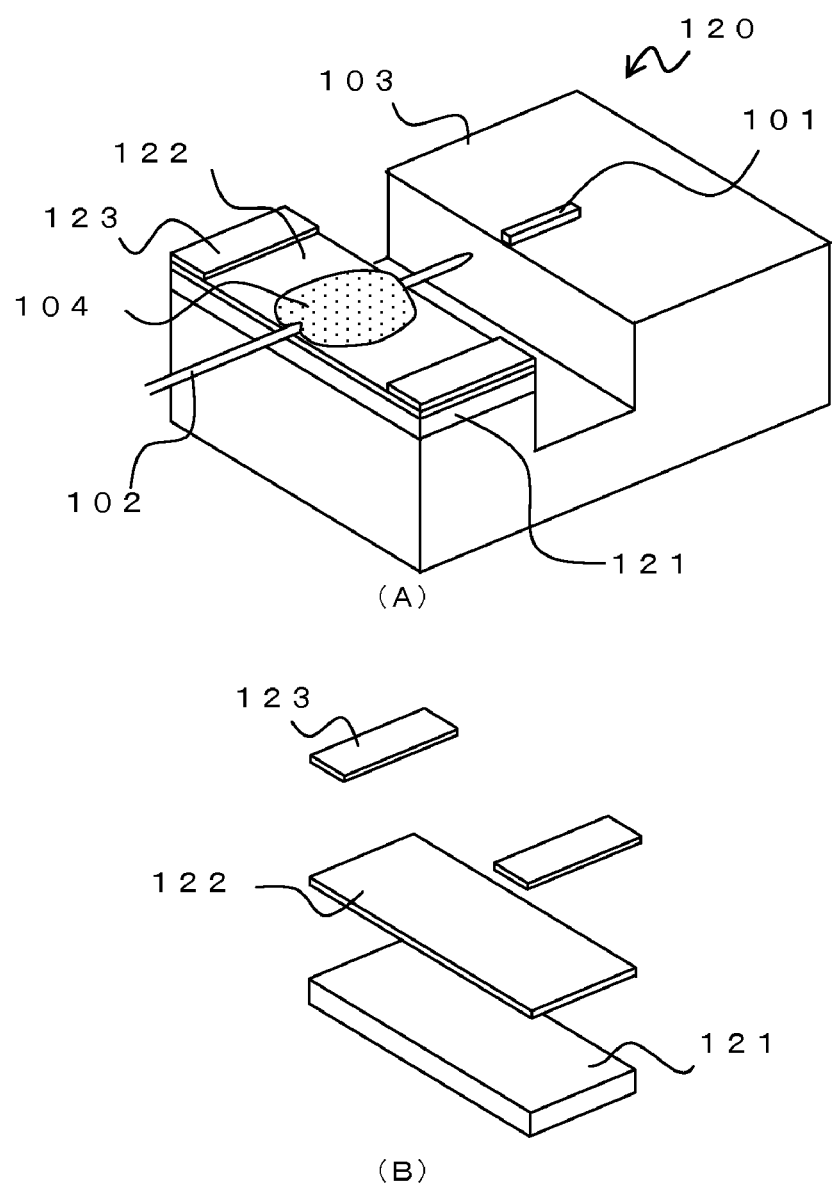

FIG. 11 show the semiconductor laser module (L4) which has the cut-out (9c), FIG. 11A a top view, and FIG. 11B a sectional view of FIG. 11A at the D-D line. The semiconductor laser module (L4) has the reflection portion (25) which is provided at the part of the cut-out (9c) corresponding to the anchoring material (6) (under the anchoring material (6)). The reflection portion (25) is a slope (for example, about 45 degrees) on which mirror surface finish is performed. When a laser light is emitted from the lateral side of the cut-out (9c) utilizing the laser light irradiator (12), the reflection portion (25) reflects the laser light in the direction toward the anchor member (5), and the bottom surface of the anchor member (5) is irradiated with the laser light. The coating material (24) which is an absorbent of the laser light may be provided on the bottom surface of the anchor member (5) (on the laser light irradiated region). Furthermore, the reflection portion (25) may also be used in combination with various cut-outs, not restricted to the cut-out (9c).

FIGS. 10C to 10F show other embodiments of the anchor member (5). As shown in FIG. 10C, the recess (22) may be formed on the bottom surface of the anchor member (5) under the portion on which the anchoring material (6) is placed. The recess (22) is formed at the portion of the anchor member (5) to be heated. Since thickness of the anchor member (5) is small due to the recess (22), propagation of heat to the surface of the anchor member (5) is easy, and thus the anchoring material (6) can be heated and melted more efficiently.

Even if a material with poor thermal conductivity of less than 60 W/m·K, or a material with good thermal conductivity of more than 100 W/m·K is adopted as the anchor member, heat capacity of the part other than the heated part (installation portion of the anchoring material) can be increased in both cases, because thickness of the part other than the heated region of the anchor member (5) can be increased. Accordingly, the propagation of heat to the base (8) can be suppressed and the operation time for fixing (heating time) can be prolonged. Furthermore, since heat capacity of the recess (22) is reduced, cooling time of the anchoring material (6) can be shortened.

When a material with low thermal conductivity is adopted as the anchor member, an especially large advantage of the recess (22) can be obtained. There are problems, for example, that if the anchor member (5) is thick, heat propagation to its surface is difficult, and that if the anchor member (5) is thin, its mechanical strength cannot be maintained. However, when the recess (22) is formed, the excellent thermal conduction to the upper surface of the anchor member (5) and the excellent mechanical strength can be compatible.

Furthermore, as shown in FIG. 10D, the grooves (23) for separating the heated part may be provided on the bottom surface of the anchor member (5). The grooves (23) are formed in the regions of the bottom surface of the anchor member (5) corresponding to the regions situated at both lateral sides of the portion on which the anchoring material (6) is arranged. That is, the portion between both grooves (23) on the bottom surface of the anchor member (5) is the heated part. Due to the existence of the grooves (23), the thermal conduction to the outsides of the grooves (23) is suppressed, since the cross sections of the anchor member becomes small at the positions of the grooves (23). Accordingly, propagation of the heat to the base (8) is suppressed.

Furthermore, as shown in FIG. 10E, both the grooves (23) which separate the heated part and the recess (22) surrounded by the grooves (23) may be provided on the back surface of the anchor member (5). If the anchor member (5) has only a flat structure, temperature distribution arises both the inside and the outside of the heated part, since heat propagates outward around the heated part. However, according to this constitution, the heat capacity outside the region surrounded by the grooves (23) is large if any material is adopted, the heat which propagates to the outside of the grooves (23) is compensated, uniform heat distribution can be attained, and the adhesiveness of the anchoring material (6) to the anchor member (5) is improved.

Furthermore, as shown in FIG. 10F, a space S for laser heating may be provided in the regions on the anchor member (5) situated at both sides of the anchoring material (6), near the anchoring material (6). A coating material (24) which absorbs the laser light may be applied to the surface of the space S. If a material with low affinity to the anchoring material (6), such as solder or low melting glass, is used as the coating material (24), the range on the anchor member (5) where solder or the like is wettable can be regulated. Each of the examples of FIG. 10A to 10F may be applied in combination.

The embodiments of the present invention have been described above referring to the attached drawings. However, the technical scope of the present invention is not decided by the embodiments described above. It is obvious that a person skilled in the art can think of various changes or modifications within the scope of the technical idea described in the claims, and it is naturally understood that they also belong to the technical scope of the present invention.

Various kinds of embodiments mentioned above can be combined with each other, for example, in regard to the form of the cut-out, the material and the form of the anchor member, the heating method, the constitution of the anchoring material and so forth.

DESCRIPTION OF REFERENCE NUMERALS (L1), (L2), (L3), (L4): semiconductor laser module
(1): semiconductor laser element
(2): optical fiber
(3): depression
(4): light-emitting element mount
(5): anchor member
(6): anchoring material
(8): base
(9), (9a), (9b), (9c), (9d), (9e), (9f), (9g): cut-out
(10): spot heater
(11): spring
(12): laser light irradiator
(17): UV light irradiator
(20): intermediate member
(21a), (21b): thin-walled portion
(22): recess
(23): groove
(24): coating material
(25): reflection portion
(100), (110), (120): semiconductor laser module
(101): semiconductor laser element
(102): optical fiber
(103): base
(104): solder
(105): laser light
(111): heating wire
(112): supporting element
(121): substrate
(122): resistor
(123): side pad

The invention claimed is:

1. A semiconductor laser module in which an optical fiber and a light-emitting element are optically combined, comprising:
   a base;
   a light-emitting element fixed onto said base;
   an anchor member fixed onto said base; and
   an optical fiber fixed onto said anchor member and optically combined with said light-emitting element,
   wherein said optical fiber is fixed onto said anchor member by means of an anchoring material, and a cut-out is formed in the part of said base situated below the portion of said anchor member whereon said anchoring material is provided.

2. The semiconductor laser module according to claim 1, wherein:
   said cut-out is a through-hole provided in said base;
   said anchor member is provided so as to straddle said through-hole nearly in the same direction as the axial direction of said optical fiber, and
   the width of said through-hole transverse to the axial direction of said optical fiber is larger than the width of said anchor member transverse to the axial direction of said optical fiber.

3. The semiconductor laser module according to claim 1, wherein a recess is formed at a region of the bottom surface of said anchor member corresponding to the portion whereon said anchoring material is arranged.

4. The semiconductor laser module according to claim 1, wherein said anchor member is UV light-permeable and said anchoring material is a UV light curing resin.

5. The semiconductor laser module according to claim 1, wherein depressions are formed in the said anchor member installation positions on said base, and thereby the positioning of said anchor member on said base is possible.

6. A manufacturing method of a semiconductor laser module in which an optical fiber and a light-emitting element are coupled optically, comprising:
   adopting a base whereon a light-emitting element and an anchor member are fixed;
   installing an optical fiber on said anchor member so as to be optically coupled with said light-emitting element;
   providing an anchoring material to said optical fiber; and
   treating said anchoring material with heat or with UV light irradiation from below said anchor member by utilizing a cut-out provided in the part of said base corresponding to the portion whereon said anchoring material is arranged, so that said optical fiber is fixed onto said anchor member by means of said anchoring material.

* * * * *